April 19, 1938.　　　M. A. BOSTWICK　　　2,114,829
NETWORK RELAY
Filed Sept. 13, 1935　　　2 Sheets-Sheet 1
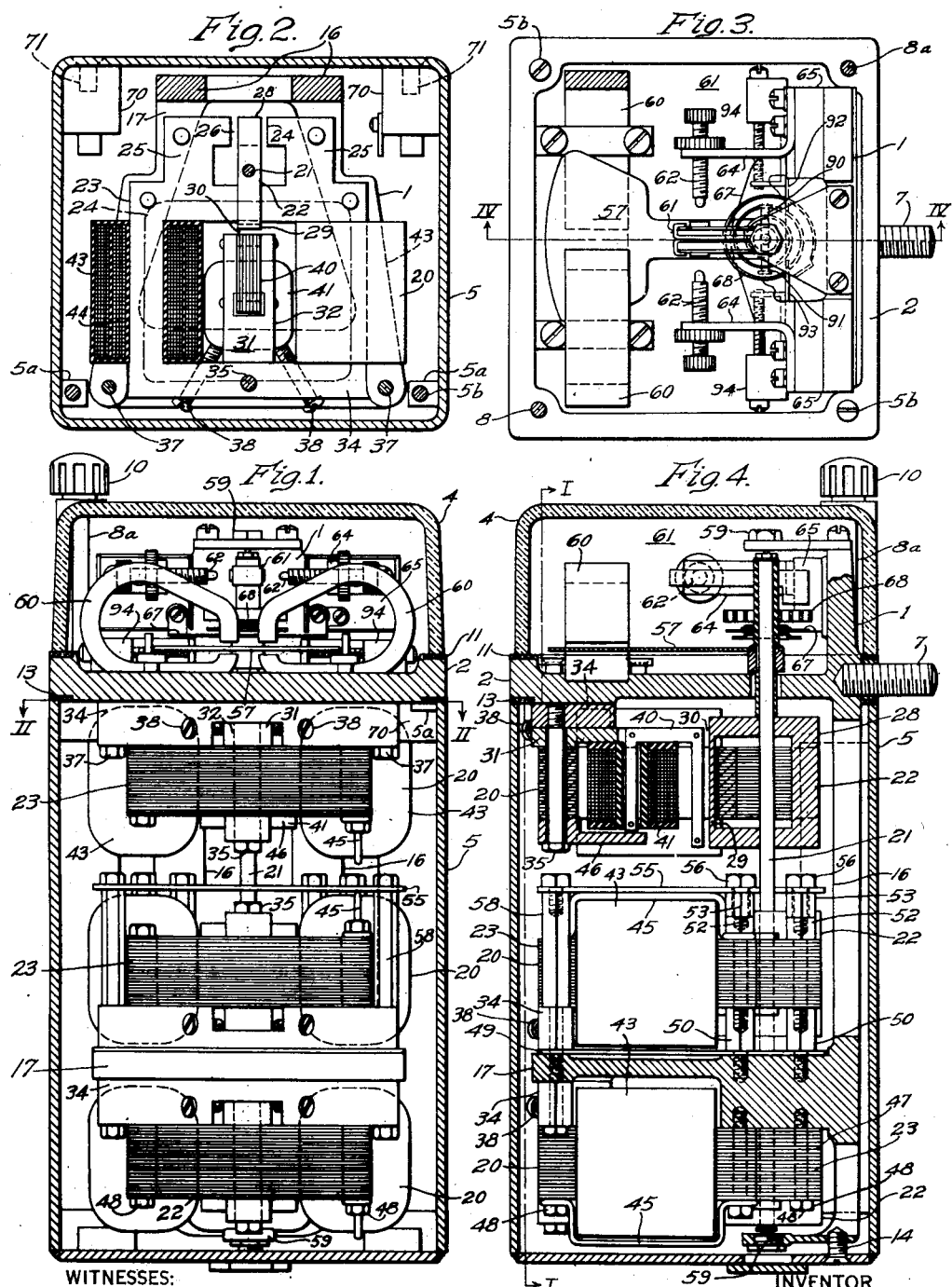
WITNESSES:
INVENTOR
Myron A. Bostwick.
BY
ATTORNEY April 19, 1938.  M. A. BOSTWICK  2,114,829
NETWORK RELAY
Filed Sept. 13, 1935  2 Sheets-Sheet 2
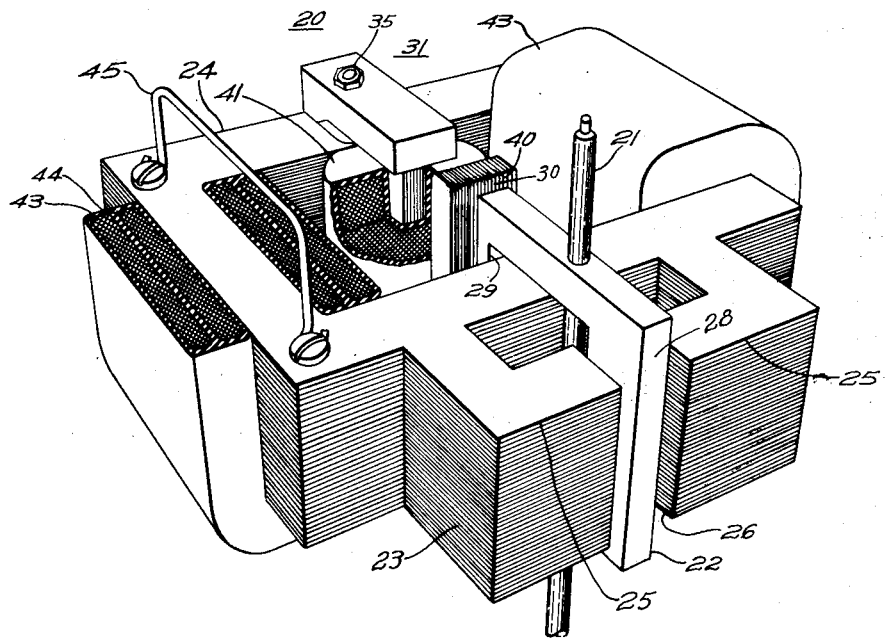
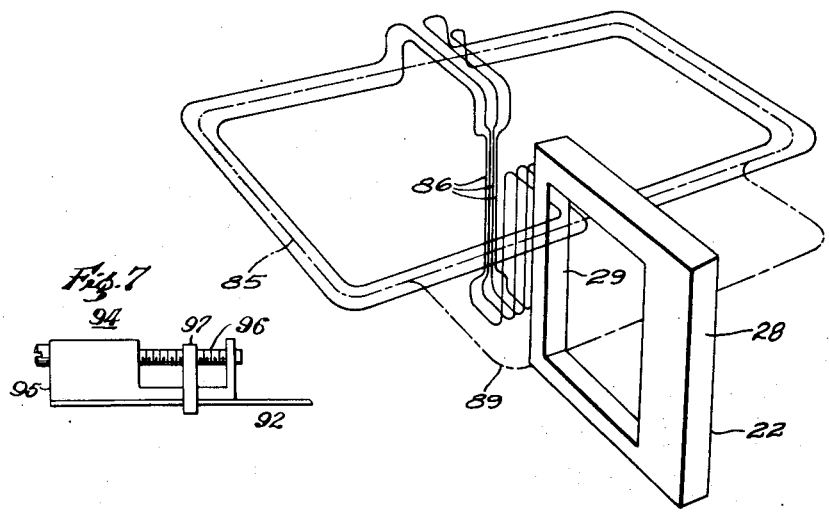
WITNESSES:
C. J. Weller.
G. C. Harrison
INVENTOR
Myron A. Bostwick.
BY
ATTORNEY Patented Apr. 19, 1938

2,114,829

UNITED STATES PATENT OFFICE 2,114,829

NETWORK RELAY

Myron A. Bostwick, North Arlington, N. J., assignor to Westinghouse Electric & Manufacturing Company, East Pittsburgh, Pa., a corporation of Pennsylvania Application September 13, 1935, Serial No. 40,389

10 Claims. (Cl. 175—335)

My invention relates to protective apparatus for alternating-current network distribution systems and particularly to network relays for use in connection with the network circuit breakers of such systems. In such network systems, a distribution grid is supplied from a plurality of feeders by means of step-down transformers. Suitable circuit breakers are interposed in the secondary leads of each transformer for the purpose of disconnecting a feeder from the grid entirely in the event of a high-tension fault. Such circuit breakers are known in the art as "network circuit breakers", and the protective unit consisting of a network circuit breaker, its relays and control apparatus, as a "network protector". The network relay of such protectors is a power directional device which serves to trip the network circuit breaker in the event of reverse power flow above a predetermined minimum. This relay also serves to reclose the network circuit breaker under the following conditions only:

1. When the network is completely deenergized and the feeder is energized to approximately normal voltage.

2. When both the feeder and network are energized, and the relationship of feeder and network voltage is such that, if the circuit breaker were closed, an opening condition would not immediately be established.

In the usual forms of network relay, a spring is used for accomplishing Function (1) indicated above, and some form of shading coil, known as an overvoltage adjusting device, is used to overcome the effect of the spring in accomplishing Function (2). The present relay employs a spring for accomplishing Function (1), but utilizes a novel arrangement of magnetic elements to accomplish Function (2).

It is accordingly an object of my invention to provide a network relay having a novel overvoltage adjusting device.

Another object of my invention is to provide a novel network relay of simple and compact construction.

A further object of my invention is to provide a novel inductor loop type relay element of general utility in the protective art.

Other objects of my invention will become evident from the following detailed description taken in conjunction with the accompanying drawings, in which:

Fig. 1 is a vertical sectional view of a relay embodying my invention, taken on the line I—I of Fig. 4;

Fig. 2 is a sectional view taken on the line II—II of Fig. 1;

Fig. 3 is a plan view of the relay shown in Fig. 1 with the cover removed and parts broken away and in section;

Fig. 4 is a vertical sectional view taken on the line IV—IV of Fig. 3, showing part of the relay mechanism in elevation;

Fig. 5 is a view in perspective of one element of the relay shown in Figs. 1 to 4;

Fig. 6 is a diagrammatic view in perspective showing the principal magnetic circuits in the element shown in Fig. 5; and Fig. 7 is a detail view showing one of the adjustments of the relay of my invention.

Referring to Figs. 1 to 4 in detail, the relay comprises a main frame 1 of suitable cast metal, having a transverse web 2 of substantially square configuration which serves as a base for a glass cover 4 and a welded metal housing 5. A heavy mounting and grounding stud 7 is tapped into the frame 1 for supporting the relay from a panel (not shown).

A pair of lugs 5a are welded within the housing 5 (see Fig. 2) to provide a means of attachment of the latter to the web 2. The lugs 5a are internally threaded to receive a screw 5b and a cover stud 8 (Fig. 3) which pass through suitable holes in the web 2 and are threaded into the lugs 5a. A somewhat shorter cover stud 8a is threaded into the web 2 at the corner diagonally opposite the stud 8. The housing 5 is also secured to the frame 1, near its lower end, by means of a machine screw 14, as shown in Fig. 4.

The cover 4 is secured to the web 2 by means of the cover studs 8 and 8a and a pair of thumb nuts 10, and a suitable gasket 11 is interposed between the web 2 and cover 4, in the usual manner. The metal housing 5 is similarly provided with a gasket 13.

The frame 1 is provided with a pair of integral extensions 16 which are joined near their lower ends to form a heavy base portion 17.

The relay operating mechanism consists of three elements 20, of the inductor loop type, having their loops 22 mounted on a common shaft 21. The three elements 20 are of the same construction, and the upper and lower ones are mounted in the same relative positions. The center element 20, however, is inverted in order to permit attachment to the base portion 17.

The construction of the inductor loop elements 20 is best shown in Fig. 2, in which the upper element 20 is shown in plan view with part of the coils in section. The element 20 includes a laminated magnetic core 23 having a rectangular main magnetic circuit 24, and a pair of polar projections 25 separated by an air gap 26.

The inductor loop 22 is preferably a single-turn closed conductor of aluminum or copper, which loosely surrounds one side of the main magnetic circuit 24 and has one side 28 included in the air gap 26. The opposite side of the loop 22 is in the form of a straight inductor portion 29 and is located in a second air gap 30 formed between the rectangular main magnetic circuit 24 and a transverse magnetic member 31.

The transverse magnetic member 31 serves to supply a motive flux component acting upon the inductor portion 29 of the loop 22 in such direction as to develop a torque tending to rotate the loop 22 about the axis of the shaft 21 when current flows in the loop. The transverse magnetic member 31 may obviously assume any of a variety of forms and may be arranged in various positions to accomplish this function. However, I prefer to utilize the magnetic member 31 as an adjusting device also, and, for this purpose provide a rotatable non-magnetic yoke 32 secured to a non-magnetic support 34 by means of a bolt 35 (see Fig. 4). The support 34 is secured to the web 2 by means of suitable machine screws 37, as best shown in Figs. 1 and 2. The support 34 is tapped to receive two adjusting screws 38 which engage the yoke 32 angularly, as shown in Fig. 2, to permit angular adjustment of the yoke 32 about the bolt 35 as a center. A laminated U-shaped magnetic assembly 40 is riveted or otherwise suitably secured in the yoke 32 so that one leg of the U lies parallel to and adjacent the inductor portion 29 of the loop 22 (see Fig. 4).

The other leg of the U-shaped magnetic assembly 40 is of square form and quite restricted cross-sectional area as compared with the other parts of the magnetic circuit, and is provided with a current coil 41 mounted on the restricted portion. The purpose of the restricted magnetic section of the assembly 40 is to limit the current coil flux by magnetic saturation, for a purpose which will hereinafter be explained.

A pair of potential coils 43 and a pair of phasing coils 44 are mounted on the outside legs of the main magnetic circuit 24. The potential coils 43 are preferably of equal number of turns and develop magnetomotive forces acting around the main magnetic circuit 24 in the same direction. The phasing coils 44 are also preferably of equal number of turns but develop magnetomotive forces which act in opposite directions around the magnetic circuit 24. It will be seen that the potential coils 43 tend to circulate magnetic flux around the main magnetic circuit 24, whereas the phasing coils 44 tend to produce flux in the transverse magnetic member 31 which divides in the main magnetic circuit 24.

However, for some applications, I prefer to design the potential coils 43 with slightly unequal number of turns, or the phasing coils 44 with slightly unequal number of turns, or both, in order to develop biasing torques which will be effective under predetermined conditions. If the phasing coils 44 are designed with slightly unequal number of turns, for example, a biasing torque is produced as follows: The unbalanced differential of magnetomotive forces produced by the phasing coils 44 acts to circulate flux around the magnetic circuit 24, and induce a current in the loop 22. This current reacts upon the flux produced by the balanced components of magnetomotive forces produced by the phasing coils 44, to produce a torque component dependent on the phasing voltage only. This torque component may be made to act in either direction by winding one or the other of the phasing coils 44 with the larger number of turns. Similarly, a biasing torque proportional to line or network voltage may be produced by designing the potential coils 43 with unequal numbers of turns.

Although an electromagnetic bias, produced by unbalanced magnetomotive forces as explained above, may be desirable for some applications, for most applications I prefer to utilize a magnetic shunt for each element 20, as best shown at 45 in Figs. 1 and 4. The magnetic shunts 45 are preferably of iron wire and are arranged to provide a leakage path around the potential coil 43 and phasing coil 44 which together produce the greater resultant magnetomotive force when the feeder circuit is energized and the network circuit deenergized. The shunts 45 arranged in this way produce an unbalancing effect and torque tending to rotate the relay shaft 21 in the closing direction.

A stationary magnetic member 46 is held by the bolt 35 in a position to magnetically connect the rectangular main magnetic circuit 24 with the U-shaped assembly 40. This arrangement provides a substantially S-shaped magnetic path across the main magnetic circuit, as will be apparent from Fig. 4. The magnetic member 46 is of sufficient width to maintain a substantially uniform effective air-gap in the S-shaped magnetic path for all positions of the yoke 32.

The base portion 17 is provided with a shoulder 47 (Fig. 4) upon its under surface, to which the magnetic core 23 of the lower element 20 is secured by means of machine bolts 48, which also serve to secure the magnetic shunt 45. The web 2 is provided with a similar shoulder (not shown) to which the magnetic core 23 of the upper element 20 is secured.

A somewhat different mounting is provided for the center element 20, in order to reduce the effect of stray magnetic fields between the elements. A shield 49, of suitable conducting metal, such as cold-rolled steel, is secured to the base portion 17 by means of a plurality of hexagonal studs 50. The upper ends of the studs 50 are internally threaded to receive the threaded portions of a second set of hexagonal studs 52, which serve to secure the magnetic core 23 to the studs 50. A plurality of tubular spacers 53 are provided on the studs 52, and a second steel shield 55 is secured over the spacers 53 by means of a set of machine screws 56. At the front end of the center element 22 (left side of Fig. 4) the core 23 is bolted to the support 34 as described above in connection with Figs. 1 and 2, and the shield 55 is supported by means of a pair of long hexagonal studs 58 which serve to fasten the support 34 to the base portion 17.

The frame 1 is provided with suitable bearings 59 for the shaft 21. Near the upper end of the shaft 21, a damping vane 57 of copper or aluminum is mounted in such manner as to rotate between the poles of a pair of permanent magnets 60. The purpose of this arrangement is to damp out bouncing movements of the shaft 21 and prevent chattering of the relay contacts.

The relay is provided with a spring contact assembly 61 which cooperates with stationary adjustable contact screws 62 to form sets of front and back contacts, in well known manner.

The contact screws 62 are mounted upon L-shaped metal brackets 64 which are secured in insulated relationship to a pair of insulating blocks 66. A metal plate 67 is secured between the insulating blocks 65 to provide a stationary support for the usual biasing spring 68, the free end of which is secured to the shaft 21.

The spring 68 acts in the usual manner in the direction to cause engagement of the relay closing contacts, and any of the several electromagnetic biasing expedients may be utilized for overcoming the biasing action of the spring 68 when the potential coils 43 are energized at normal potential, so as to permit the so-called phasing operation of comparing network and feeder voltages. The circuits and general operation of such arrangements involving an electromagnetic biasing element are known in the art, being described, for example, in the United States patent to J. S. Parsons, No. 1,973,097, issued September 11, 1934, and assigned to the Westinghouse Electric & Manufacturing Company. However, for some applications of the present relay, I prefer to utilize the specific connections disclosed in my copending application, Serial No. 37,318, filed August 24, 1935, and assigned to Westinghouse Electric & Manufacturing Company.

The shaft 21 is provided with a pair of studs 90 and 91, shown in Fig. 3, which project outward in positions to engage one or the other of a pair of flat biasing springs 92 and 93, when the shaft 21 approaches a contact operating position in either direction of rotation. Each of the springs 92 and 93 is provided with a separate adjusting assembly 94, the details of which are shown in Fig. 7. Referring to Fig. 7, the assembly 94 comprises a base 95 in which a threaded shaft 96 is rotatably supported. A runner 97, is internally threaded to engage the shaft 96, and is arranged to vary the effective free length of the spring 92. In this way, the torque required for contact operation can be adjusted separately for each direction of rotation of the shaft 21.

Referring to Fig. 2, a pair of internal terminal blocks 70 are mounted in adjacent corners of the housing 5 and secured to the latter by any suitable fastening members, such as machine screws 71. As the specific construction of the terminal block 70 and its associated apparatus for establishing electrical connections for the relay form no part of the present invention, detailed description of such apparatus is omitted.

The principal operating parts of one of the inductor loop elements 20 are shown in perspective in Fig. 5. Referring to this figure, the operation may be set forth as follows: The potential coils 43 act to produce equal magneto-motive forces which act in the same direction around the magnetic circuit 24. As the magnetic circuit 24 is symmetrical, neglecting the effect of the magnetic shunt 45, the portion of the circuit 24 enclosed by the inductor loop 22 is at the same magnetic potential as the portion immediately under the magnetic member 46. Accordingly, the magnetomotive forces produced by the potential coils 43 circulate flux around the magnetic circuit 24, but not across the transverse magnetic member 31.

The flux produced by the potential coils 43, which interlink the inductor loop 22, produce currents which circulate around the loop, and lag the potential impressed upon the potential coils 43 by a small phase angle such as 17°. In order to produce wattmetric response of the relay, sufficient capacitance is introduced in series with the potential coils 43, by means of external condensers (not shown), to bring the currents in the loop 22 into phase with the voltage impressed on the potential coils 43.

If flux is circulated across the transverse magnetic member 31, the current carried by the loop 22 will act upon this flux to produce a torque. This torque is of double the line frequency and tends to rotate the loop 22 in one direction or the other upon the shaft 21, depending upon the phase relationship of the induced currents in the loop 22 and the flux traversing the inductor portion 29. If the flux traversing the inductor portion 29 is in phase with the current induced in the loop 22, the torque acting upon the loop will have its maximum average value. If the flux traversing the inductor portion 29 is in quadrature with the induced current in the inductor loop 22, however, the double-frequency torque product will have an average value of zero, and there will be no tendency of the shaft 21 to rotate in either direction, assuming that the inertia of the armature and spring bias are sufficient to prevent operation in response to instantaneous values.

During normal operation of the relay, the potential coils 43 and either the current coil 41 or the phasing coils 44 are energized. As pointed out above, the phasing coils 44 act in the same manner as the current coil 41 in producing a principal flux component acting at right angles to the inductor portion 29 of the inductor loop 22. The shape of the flux paths excited by the potential coils 43 and the current coils is shown in Fig. 6. In this figure, the magnetic flux produced by the current coils 41 acts along the solid lines 86. It will be noted that this flux follows the transverse magnetic path across the loop and divides symmetrically around the main magnetic circuit of the loop. The flux component produced by the potential coils 43 follows the broken line 85. It will be noted that the flux path 85 has a component acting around the loop 24 and also a branch 89 which traverses the shunt magnetic circuit produced by the pole-tips 25 (Fig. 5).

Considering the induced currents in the inductor loop 22, these currents produce leakage flux which is not interlinked with the main magnetic circuit 24. In accordance with the usual laws applicable to an electric circuit interlinked with two magnetic circuits, the loop 22 is subject to a force which tends to move it to the position in which its leakage flux is a maximum. This position is that in which the plane of the loop 22 is substantially at right angles to the magnetic circuit which it encloses. The force produced in this way tends to oppose the directional torque produced by the loop and accordingly to reduce the sensitivity of the relay.

In order to overcome the de-sensitizing or straightening torque mentioned above, the pole-tips 25 produce a flux which acts upon the back of the inductor loop 22 in such manner as to produce a force tending to move the outer side of loop 22 toward the center of the relay. This force produces a torque on the shaft 21 which varies appoximately with the sine of the angle by which the inductor loop 22 is deflected from its central position. However, if the inductor loop is moved to any considerable angle from its central position, the flux circulated through the outer portion of the inductor loop 22 is increased because of the proximity of the loop to one or the other of the pole-tips 25. In this way, a somewhat unstable torque deflection characteristic of the inductor loop 22 is secured, which tends to increase the sensitivity of the relay.

The current flux acting across the transverse magnetic member 31 also produces a centering or desensitizing torque. This torque is limited, however, by the restricted magnetic section in the center of the current coil 41.

If the transverse magnetic member 31 is adjusted from its neutral position, as explained above, the magnetic potential at its two ends is no longer the same, and a flux component resulting from the potential coils 43, is circulated across the loop. This flux component acts upon the currents induced in the loop 22 in the same manner as the flux produced by the current coil 41. A biasing torque, dependent upon the potential flux in magnitude, and acting in either direction according to the positional adjustment of the transverse magnetic member 31, may, therefore, be produced. This torque may be utilized in various ways in the relay, but is preferably adjusted to a suitable magnitude acting in the tripping direction, to permit operation of the relay in response to a comparatively small reverse power value, such as the magnetizing losses of the transformer bank associated with the network protector.

As mentioned above, because of the action of the magnetic shunts 45, a biasing torque dependent upon the resultant magnetomotive force of one of the potential coils 43 and one of the phasing coils 44 is produced in the relay. This resultant is maximum when the phasing voltage is maximum, that is, when the feeder circuit is energized and the network circuit deenergized. The magnetic shunts 45 are so designed that under the condition of maximum phasing voltage, the biasing torque produced by the action of the magnetic shunts 45 exceeds the resultant of all other torques in the relay and causes closure of the relay closing contacts.

When the feeder circuit and network circuit are both energized to approximately normal voltage, the voltage impressed on the phasing coils 44 is quite small and the biasing action of the magnetic shunts 45 correspondingly reduced. Under these conditions, the flat spring 92 which opposes movement of the relay armature to closing position, prevents a closing operation of the relay except when the feeder voltage exceeds the network voltage by a small differential, such as ½ volt. The value of this voltage differential may be adjusted by adjusting the free length of spring 92 in the manner explained above.

Although the relay of my invention is preferably operated in the manner explained above, it may be satisfactorily operated in various other ways. For example, the magnetic shunts 45 may be removed and the contacts 62 adjusted for a minimum movement of the movable parts to effect contact operation. For such adjustments, the current poles 31 are preferably adjusted to central position so as to produce no bias in either direction, and an unbalanced arrangement of phasing coils utilized to effect a closing operation when the feeder circuit is energized and the network circuit is deenergized.

I do not intend that the present invention shall be restricted to specific structural details, arrangement of parts or circuit connections herein set forth, as various modifications may be effected without departing from the spirit and scope of my invention. I desire, therefore, that only such limitations shall be imposed as are indicated in the appended claims.

I claim as my invention:

1. In an alternating-current relay, a pair of relatively movable members, one of said members having magnetic means completing a main magnetic circuit, the other of said members having a conductor completing an electric circuit interlinked with said main magnetic circuit and with a leakage flux circuit connected with said main magnetic circuit, inductive means for energizing said main magnetic circuit, means for producing a motive flux traversing said conductor, and electromagnetic means acting upon said conductor at a different point from said motive flux for opposing relative movement of said members toward a position of maximum leakage reactance of said electric circuit.

2. In an alternating-current relay, a pair of relatively movable members, one of said members having magnetic means completing a main magnetic circuit, the other of said members having a conductor completing an electric circuit interlinked with said magnetic circuit, inductive means for energizing said main magnetic circuit, means for producing a motive flux traversing said conductor, and electromagnetic means acting upon said conductor at a different point from said motive flux for producing a force between said members tending to balance the force component produced by said inductive means independently of said motive flux.

3. In an alternating-current relay, a stationary member, a rotary member associated with said stationary member and mounted for rotary movement about an axis, said stationary member having magnetic means completing a main magnetic circuit, said rotary member having a conductor completing an electric circuit interlinked with said main magnetic circuit, inductive means for energizing said main magnetic circuit, means for producing a motive flux traversing said conductor, and magnetic means forming a division of said main magnetic circuit, said division including a polar projection arranged to act electromagnetically upon said electric circuit at a different point from said motive flux.

4. In an alternating-current relay, a magnetic core having a substantially closed symmetrical magnetic loop and a pair of symmetrical pole pieces forming a division magnetically parallel to a portion of said loop, said division having an air gap, a movable inductor loop interlinked with said magnetic loop and having a current-carrying portion in said air gap, a common inductive means for energizing said magnetic loop and said division, and means for producing a motive flux traversing said inductor loop.

5. In an alternating-current network relay, a power-directional element having an armature, a spring arranged to bias said armature to a predetermined position and electromagnetic means for moving said armature, said electromagnetic means including a core of magnetic material having a movable polar portion, and means for adjusting the position of said polar portion to thereby modify the effect of said spring.

6. In an alternating-current network relay, a power-directional element having an armature, a spring arranged to bias said armature and electromagnetic means for moving said armature, said electromagnetic means including a potential winding and a core of magnetic material having a movable pole effective when said potential winding is energized to oppose the biasing effect of said spring, and means for adjusting the position of said pole to thereby vary the counter-biasing effect present when said potential winding is energized.

7. In an alternating-current network relay, a power-directional element having an armature including an inductor loop, a spring arranged to bias said armature to a predetermined position, and electromagnetic means for moving said armature, said electromagnetic means including a core of magnetic material completing a main magnetic circuit interlinked with said loop and and an adjustable polar portion in cooperative relationship with said loop, and means for adjusting the position of said polar portion.

8. In an alternating-current network relay, a power-directional element having an armature including an inductor loop, a spring arranged to bias said armature to a predetermined position, and electromagnetic means for moving said armature, said electromagnetic means including a core of magnetic material having a symmetrical magnetic circuit interlinked with said loop and a movable polar portion normally disposed on an axis of symmetry of said magnetic circuit, and means for adjusting the position of said polar portion with reference to said loop.

9. In an alternating-current relay of the inductor loop type, core means forming a main magnetic circuit and a magnetic path across said circuit, said path having an air gap, an inductor loop interlinked with said main magnetic circuit and having an inductor portion in said air gap, and coil means for producing unequal magnetomotive forces at two points in said main magnetic circuit on either side of said magnetic path, said coil means comprising a pair of coils unequally energized in accordance with a predetermined variable, whereby a force dependent upon the sum and difference of said unequal magnetomotive forces is exerted on said inductor portion of said loop.

10. In an alternating-current network relay, a movable member operable to a predetermined closing position, electromagnetic means for moving said member, said electromagnetic means including core means forming a main magnetic circuit and a magnetic path across said circuit, phasing coil means for producing unequal magnetomotive forces acting at two points on said main magnetic circuit to thereby circulate flux components in said main magnetic circuit and said magnetic path, and means for producing a first biasing force on said member dependent upon said flux components, and mechanical biasing means arranged to produce a second biasing force in opposition to said first biasing force.

MYRON A. BOSTWICK.